(12) United States Patent
Verfuerth (10) Patent No.: US 6,964,502 B1
(45) Date of Patent: Nov. 15, 2005

(54) RETROFIT FLUORESCENT LIGHT TUBE FIXTURE APPARATUS

(76) Inventor: Neal R. Verfuerth, 642 Western Ave., Random Lake, WI (US) 53075

( * ) Notice: Subject to any disclaimer, the term of this patent is extended or adjusted under 35 U.S.C. 154(b) by 73 days.

(21) Appl. No.: 10/780,129

(22) Filed: Feb. 18, 2004

(51) Int. Cl.⁷ .............................................. F21V 7/00
(52) U.S. Cl. ........................ 362/296; 362/225; 362/221
(58) Field of Search ................................ 362/217, 221, 362/225, 260, 296, 297, 298, 341, 346

(56) References Cited

U.S. PATENT DOCUMENTS

| | | | |
|---|---|---|---|
| 2,710,340 A * | 6/1955 | Wince | ......................... 362/296 |
| 4,435,744 A | 3/1984 | Russo | |
| 4,642,741 A * | 2/1987 | Cohn | ......................... 362/217 |
| 4,928,209 A | 5/1990 | Rodin | |
| 4,933,823 A * | 6/1990 | Taylor | ......................... 362/341 |
| 6,210,019 B1 | 4/2001 | Weathers | |
| 6,439,741 B1 | 8/2002 | Diaz | |
| 6,601,976 B1 | 8/2003 | Rhee | |

* cited by examiner

Primary Examiner—Y. My Quach-Lee
(74) Attorney, Agent, or Firm—Robert T. Johnson (57) ABSTRACT

Retrofit fluorescent light tube fixture apparatus of this invention includes a metal reflector of an inverted wave shape and fluorescent light tubes, attached to sockets, mounted in the troughs of the inverted wave shape, and a formed plastic having the same contour as the inverted wave shape, and the formed plastic fitting intimately on the back of the reflectors to be a sub-assembly, and this subassembly fitting onto a ceiling mount channel wherein side walls of the ceiling mount channel fitting into slots in sidewalls of the formed plastic backing, and the side walls of the formed plastic backing attached to live plastic hinges also attached to the formed plastic backing. Preferred material for the formed plastic backing is a rigid polyvinylchloride (PVC), and flexible PVC for the live plastic hinge. The live plastic hinge allows drop down of either side of the fixture apparatus without de-mounting from the ceiling mount channel.

6 Claims, 11 Drawing Sheets

RETROFIT FLUORESCENT LIGHT TUBE FIXTURE APPARATUS

BACKGROUND OF THE INVENTION

Up to the present time fluorescent light fixtures included elongated fluorescent light tubes, mounted in a fixture as a unit and the fixture unit installed, usually on the ceiling and when problems arose with the unit the whole fixture was removed, for example, to change the ballast then re-mount the repaired unit.

1. Field of the Invention

This invention pertains to an elongated fluorescent light tubes fixture including a ceiling mount channel and a metal, light reflector assembly section formed to fit onto a formed plastic backing, and a live plastic hinge at each of the two longitudinal edges of the formed plastic backing or segment, with fluorescent light tubes mounted in sockets at each end of the metal light reflector assembly, having the same cross section contour as the formed plastic backing and attaching the metal light reflector to the formed plastic backing for the metal light reflector, and a ballast mounted, in a channel, or groove formed on the back side of the formed plastic backing for the metal light reflector assembly, and this sub-assembly, having live plastic hinges, to complete the assembly of the retrofit fluorescent light tubes fixture assembly. The related art is in the field of illumination class 362 and subclass 217, elongated source light.

2. Objects of the Invention

An object of this invention is to disclose retrofit fluorescent light tube fixture apparatus, including a light reflector a formed plastic backing for the light reflector and each having the same cross section contour of an inverted wave shape or form for intimately fitting the formed plastic backing onto the light reflector having edges fitting into slots in the outer edges of the formed plastic backing and fluorescent light tube sockets mounted on each end of the light reflector, in the troughs of the inverted wave form, and a ballast mounted and held in position, by friction fit, between the side walls of a channel on the formed plastic backing, and wires from the ballast to the fluorescent tube sockets, this sub-assembly attached to a ceiling mount channel by means of slots in the side walls of the formed plastic backing and screws extending through the sidewalls and through the sidewall of the sides of the ceiling mount channel fitting over, astraddle of, downward extending edges of the ceiling mount channel and live plastic hinges attached to sidewalls of formed plastic backing and to the sidewalls of the formed plastic backing.

Prior Art

Prior art U.S. patents are:

6,601,976 for SNAP ASSEMBLED LIGHT FIXTURE APPARATUS.

6,439,741 for LUMINAIRE OF ELONGATE SHAPE.

6,210,019 for METHOD FOR RETROFITTING——FLUORESCENT FIXTURE.

4,928,209 for LIGHTING APPARATUS.

4,435,744 for EXPLOSION-PROOF FLUORESCENT LIGHT FIXTURE.

None of the above cited prior art patents would anticipate, or collectively make obvious this present invention.

DESCRIPTIONS OF LEGENDS

1.—Fluorescent light tube reflectors.
2.—Formed plastic backing for reflector.
3.—Blind hole apertures for button fitting of fluorescent light tube sockets.
4,4'.—Side walls of center channel of formed plastic backing.
5.—Fluorescent light tubes
6,6',6", 6'".—Fluorescent light tube sockets.
7,7'.—Side walls of plastic backing.
8.—Ceiling mount channel, (metal or plastic)
9.—Ballast.
10.—Aperture for electric power line.
11.—Electric power supply wires.
12.—Blue wire from ballast.
13.—Blue wire from ballast.
14.—Red wire from ballast.
15.—Ground wire from ballast.
16, 16'.—Live plastic hinges.
17.—Screws for attachment of light reflector sub-assembly to ceiling mount channel.
18.—Apertures for screws.
19.—Shunt wire.
20.—Light reflector subassembly.
21.—Notches for mounting of fluorescent light tube sockets.
22.—Channel on formed plastic backing.
23, 23'.—Slots in outer edges of formed plastic backing.
24.—Side elevation view of luminaire fixture assembly.
25, 25'.—Edges of fluorescent light tube reflector.
26, 26'.—Turned down edge of side walls of center channel.
27, 27'.—Slots in side walls of formed plastic backing.
28, 28'.—Side walls of ceiling mount channel.
T,T'.—Invert wave shape troughs.

DETAILED DESCRIPTION OF THE INVENTION

Up to the present time, to repair a hanging elongate fluorescent tube luminaire required dismantling of the fixture to change the ballast, for example. This invention obviates the requirement to dismantle the fixture, but instead to open the luminaire fixture by unfastening one side of the fixture to drop down the unfastened side to expose the back side of the lighting fixture to make the repairs needed, such as replacing the ballast and yet leaving one side of the fixture attached to the ceiling mount channel. (see FIG. 14).

Figure 1:
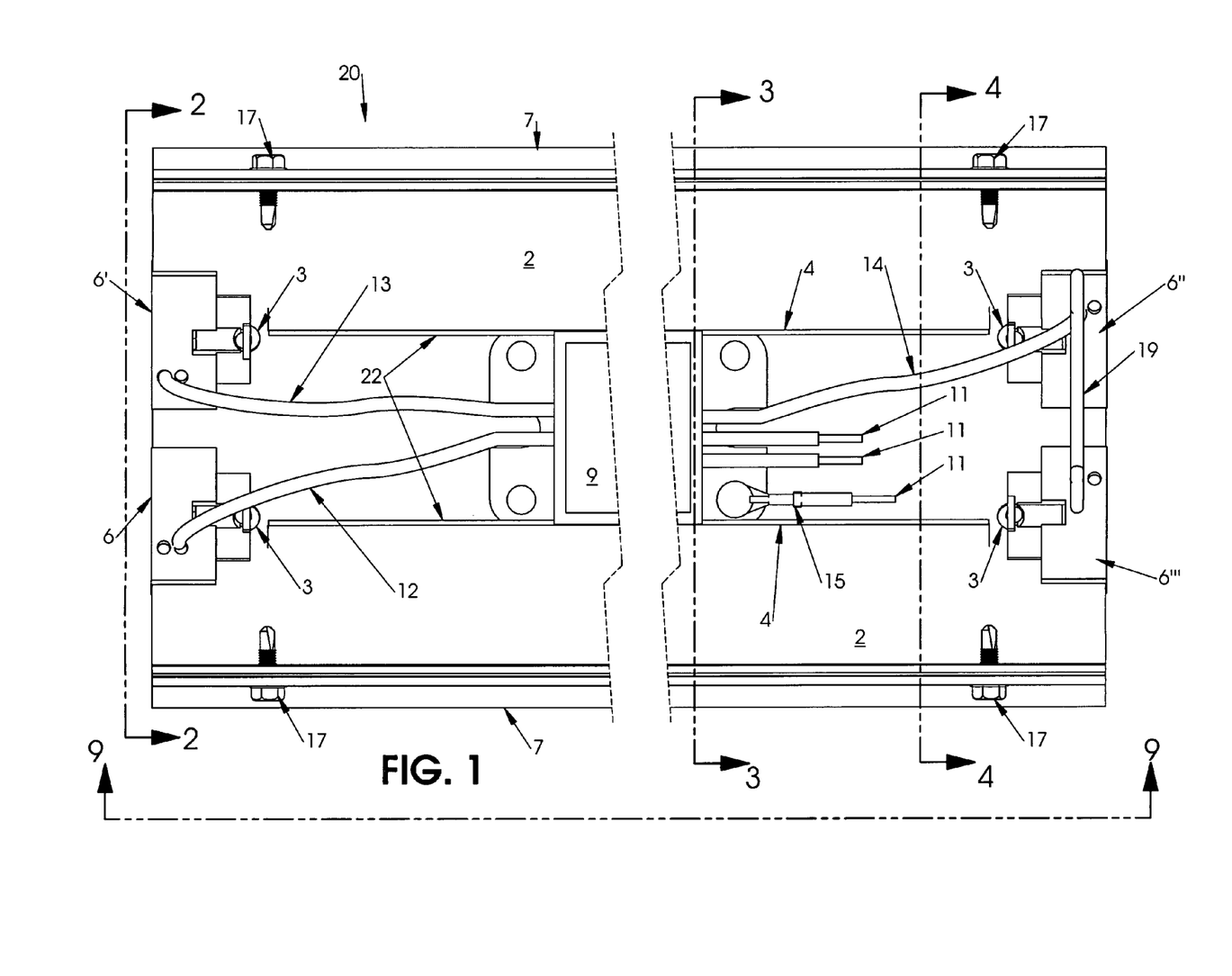
FIG 1. Top plan view of reflector assembly.
Figure 2:
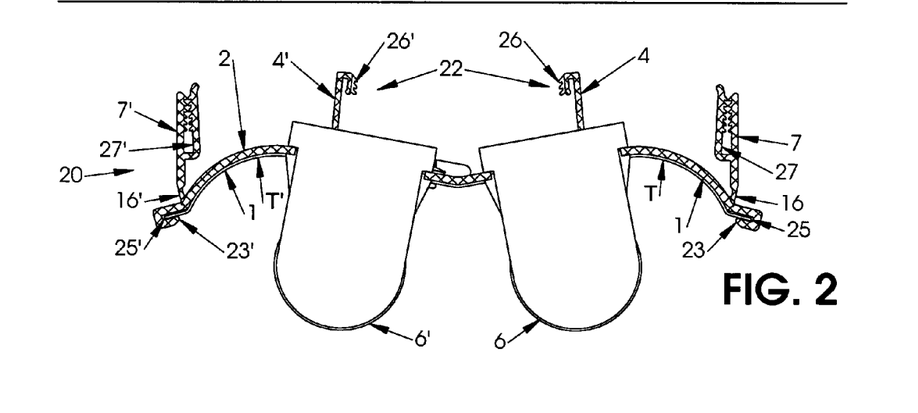
FIG 2. End cross section elevation view of reflector subassembly.
Figure 17:
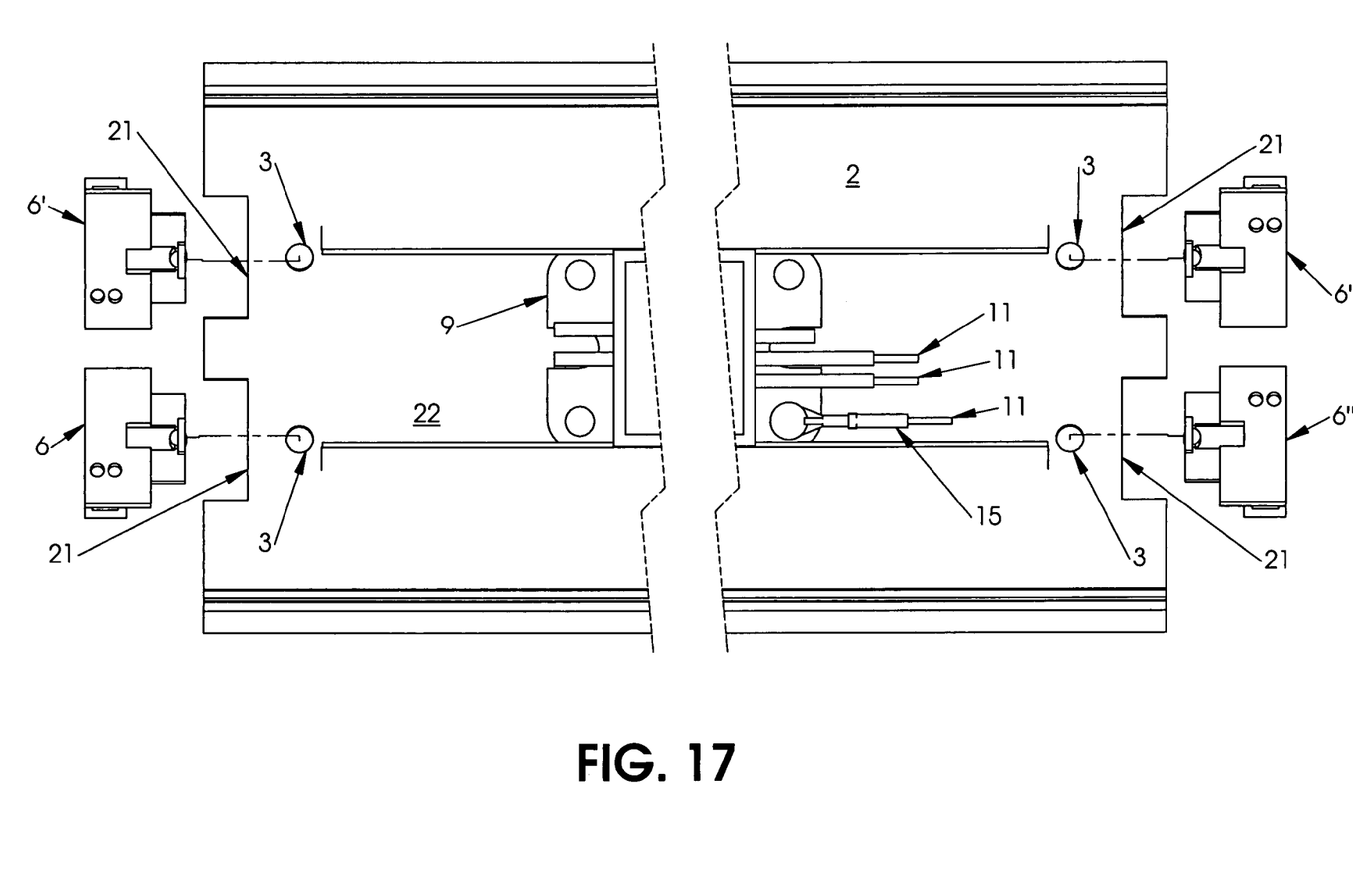
FIG. 17. Exploded top plan view of sub- assembly retrofit fluorescent light fixture.

Referring now to FIG. 1, which is a top plan view of reflector assembly, showing formed plastic backing 2 for reflector mounting of light reflector subassembly 20 and ballast 9 mounted in channel 22 and the channel 22 bounded by side walls 4, 4' of center channel of formed plastic backing 2. Fluorescent light tube sockets 6, 6', 6", 6"'are attached at each end of the light reflector sub-assembly 20, and the fluorescent light tube sockets 6 are attached in the conventional manner of a protruding button fitting into a blind hole or aperture 3, in the base of the reflector sub assembly 20, and further, as shown in FIG. 17, notches 21 are provided at the ends of the light reflector subassembly 20, for mounting of the fluorescent light tube sockets 6, 6', 6", 6"'. Blue wire 12 from ballast 9, connects to a fluorescent light tube socket 6, and a separate blue wire 13 from ballast 9, connects to another fluorescent light tube socket 6'. Red wire 14, from ballast 9, connects to fluorescent light tube socket 6", and shunt wire 19 connects socket 6" and 6"'. Ground wire 15 extends from ballast 9 to a ground. Fluorescent light tube sockets 6" and 6"' are at opposite ends of the fluorescent tubes 5, 5' from fluorescent light tube sockets 6 and 6'.

FIGS. 2, 3, 4, 5, shows the end cross section elevation view of reflector subassembly, and the formed plastic backing 2, for fluorescent light tube reflectors 1, mounting, and live plastic hinge 16, 16' which is an integral part of the formed plastic backing 2 for reflector mounting. The live plastic hinge 16 and 16' allows for swinging downward of one side of the fixture, when mounted on ceiling mount channel 8, (see FIG. 14). Side walls 7, 7' formed plastic backing 2, for fluorescent light tube reflector 1, FIGS. 2, 3, 4, 5, and 12 have slots 27, 27' to fit over the downward hanging vertical edges of ceiling mount channel 8, and preferably self tapping screws 17, (see FIG. 16) are driven into apertures 18, in slotted vertical side wall 7, 7' of formed plastic backing 2 for reflectors 1 and extending through the vertical wall of ceiling mount channel 8.

Figure 7:
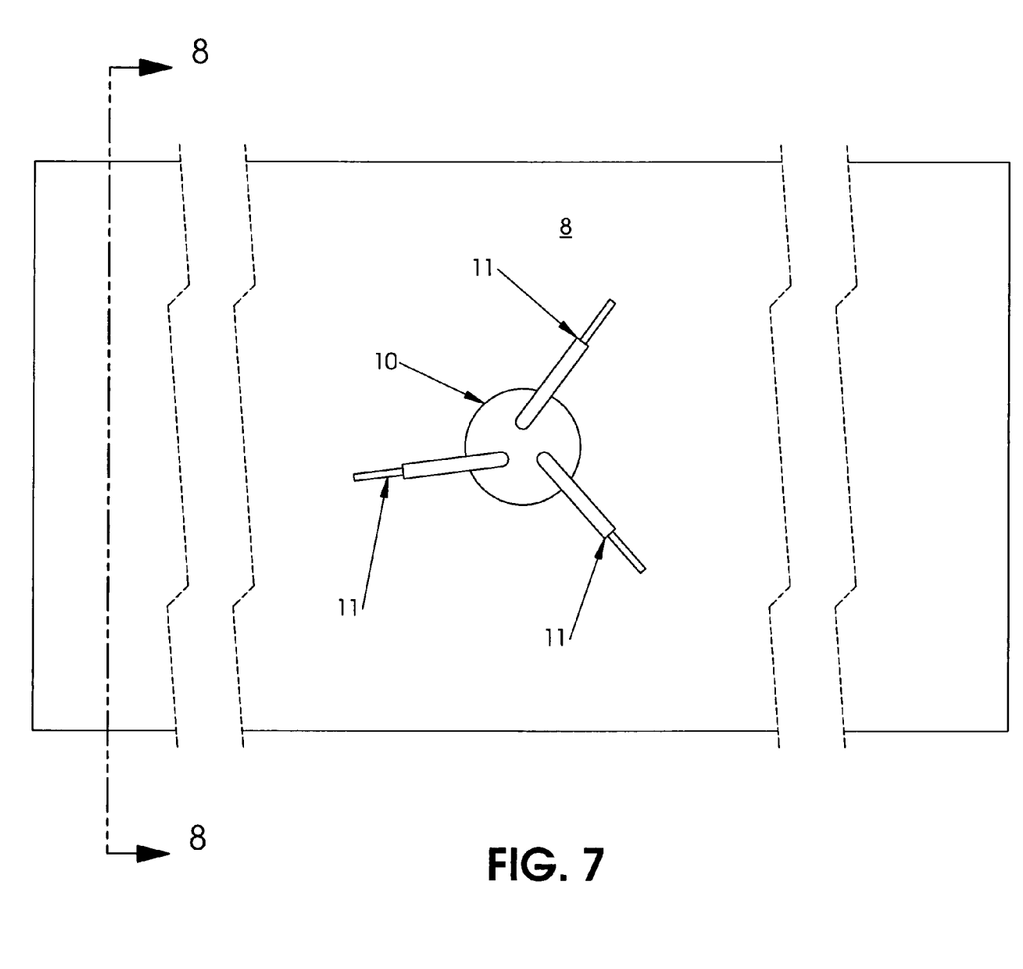
FIG. 7. Top plan view of ceiling mounting channel.
Figure 8:
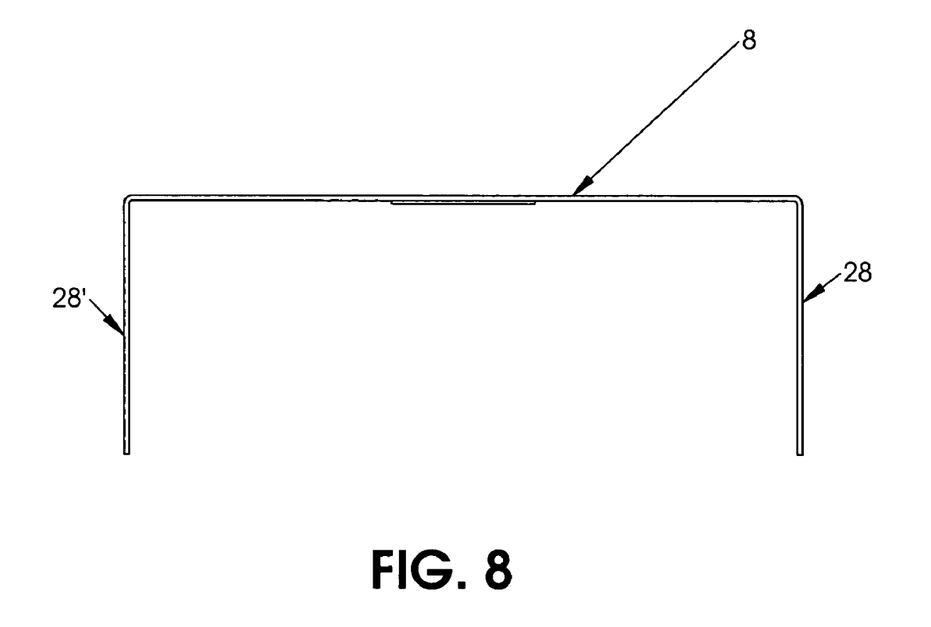
FIG. 8. Cross section view of ceiling mount channel.
Figure 9:
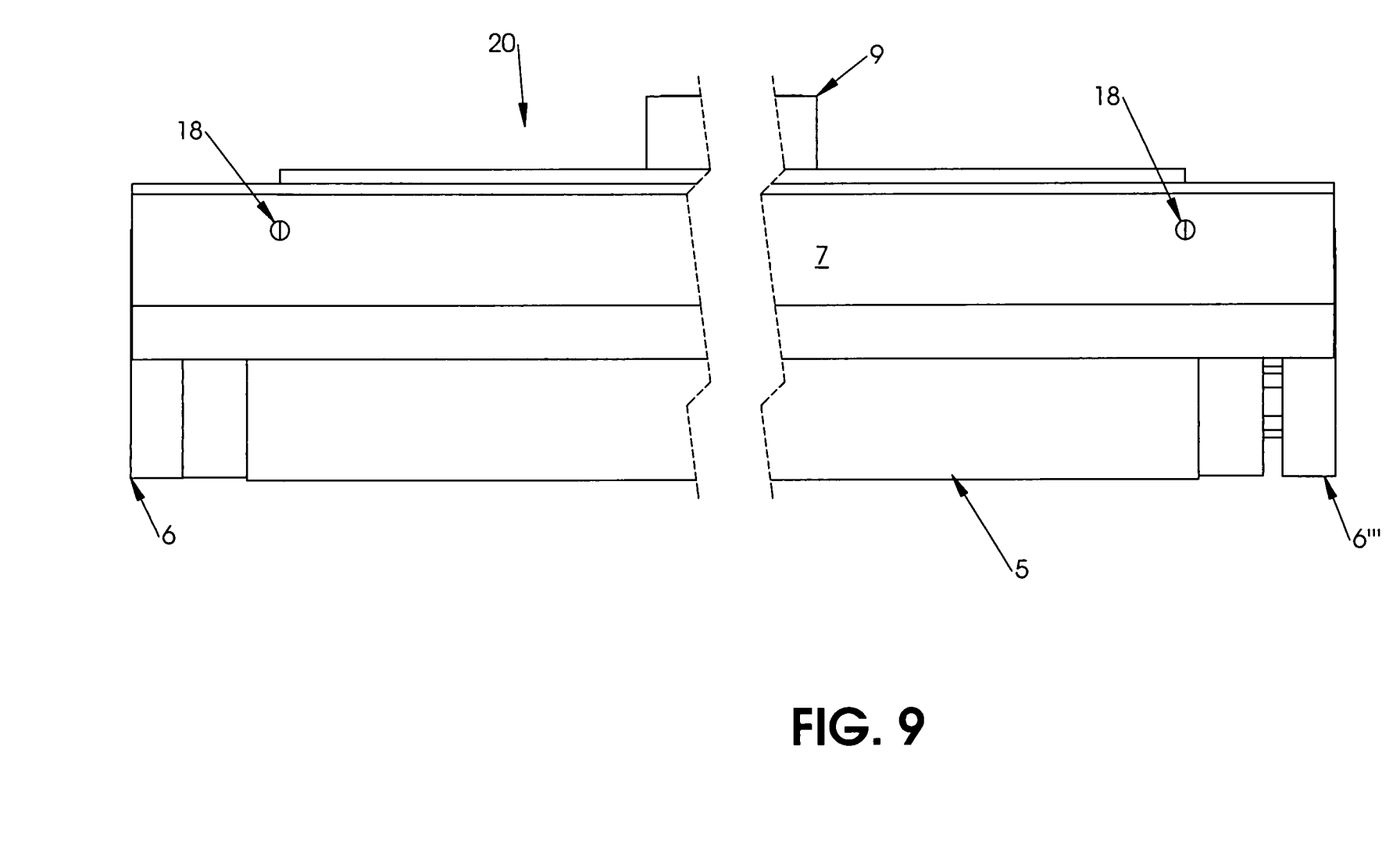
FIG. 9. Side elevation view of light fixture sub-assembly.
Figure 10:
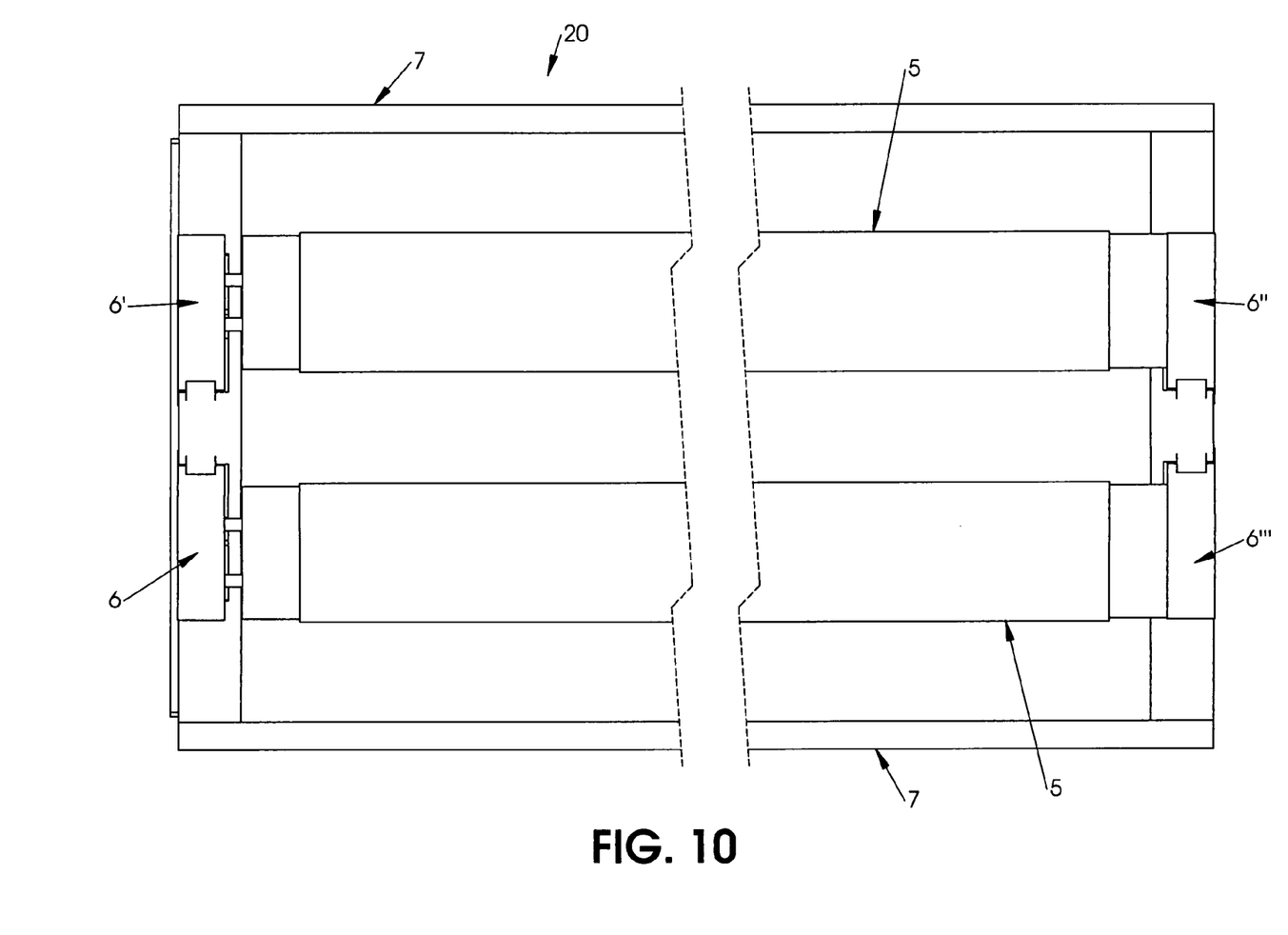
FIG. 10. Plan view of fluorescent light tube side of fluorescent light fixture sub-assembly.
Figure 11:
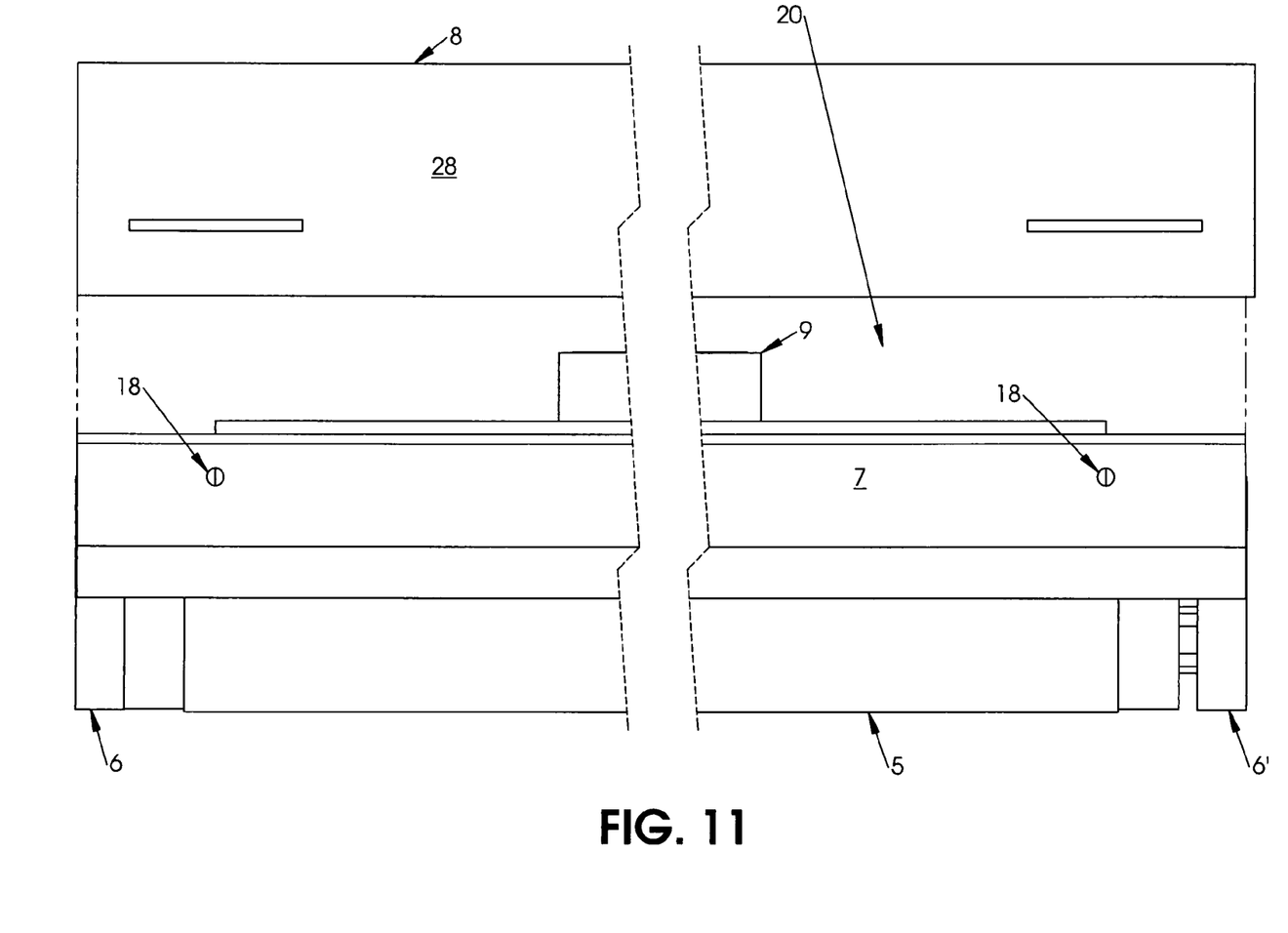
FIG. 11. Exploded side elevation view of light reflector sub-assembly and ceiling mount channel.
Figure 12:
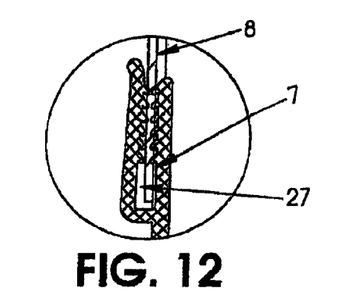
FIG. 12. Enlarged view of fitting of ceiling mount channel edge in slot of formed plastic backing.
Figures 15, 16:
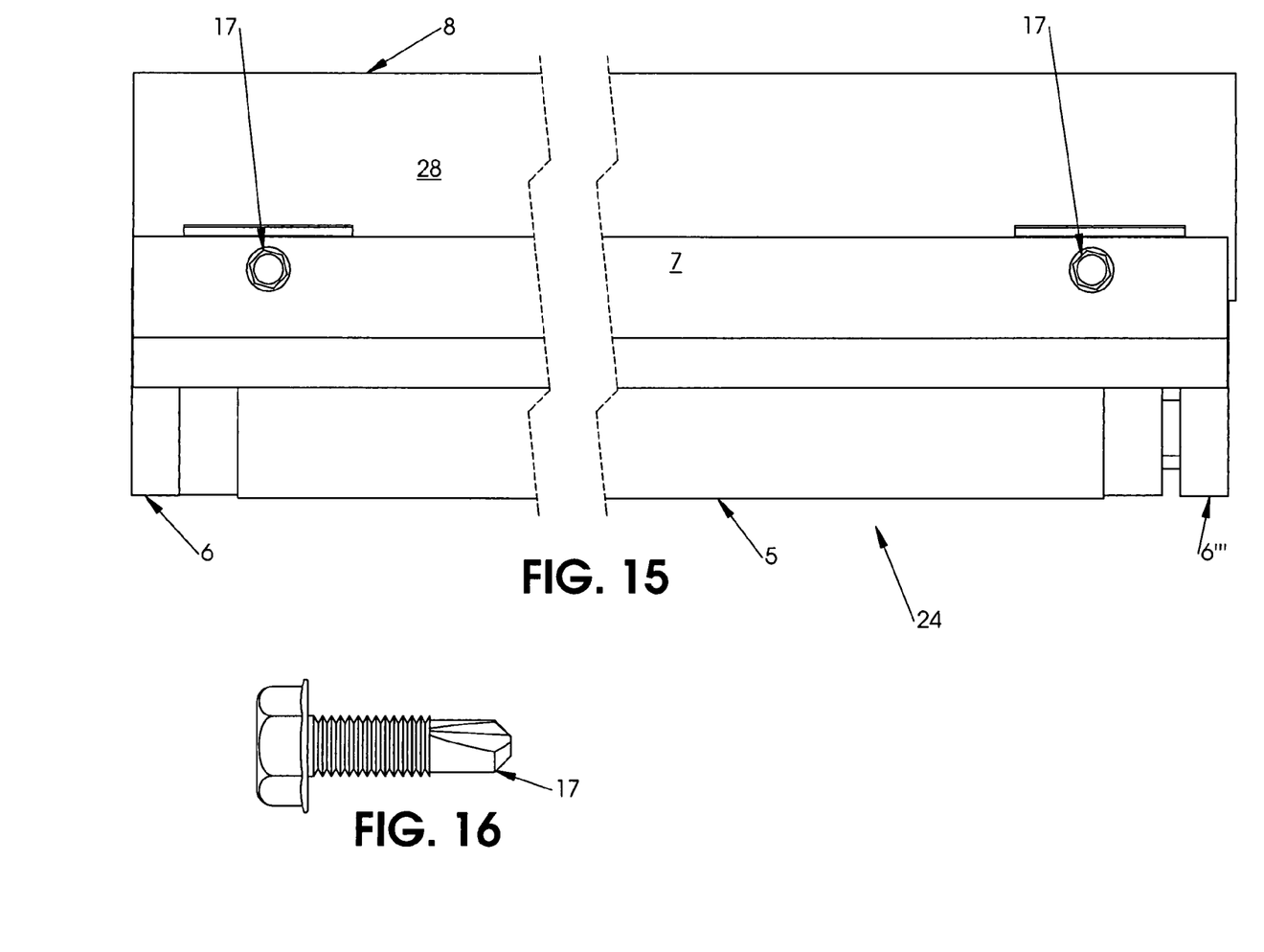
FIG. 15. Side elevation view of complete assembly of retrofit fluorescent light tube fixture assembly.
FIG. 16. Screws for attaching light reflector sub-assembly to ceiling mount channel.

FIG. 7, is a top plan view of ceiling mounting channel showing aperture 10 for electric power line in the ceiling mount channel 8, and power line wires 11 to extend through aperture 10 and to luminaire fixture assembly 24, as shown in FIG. 15, side elevation view of complete assembly, including fluorescent light tubes 5, of luminaire fixture attached to ceiling mount channel 8. FIG. 8 is a cross section view of ceiling mount channel 8. FIG. 9 is a side elevation view of light reflector sub-assembly 20, and FIG. 10 is a plan view of fluorescent light tube side of light reflector sub-assembly. FIG. 11 is an exploded side elevation view of light reflector subassembly 20, and, metal or plastic ceiling mount channel 8, aligned for assembly.

Figure 6:
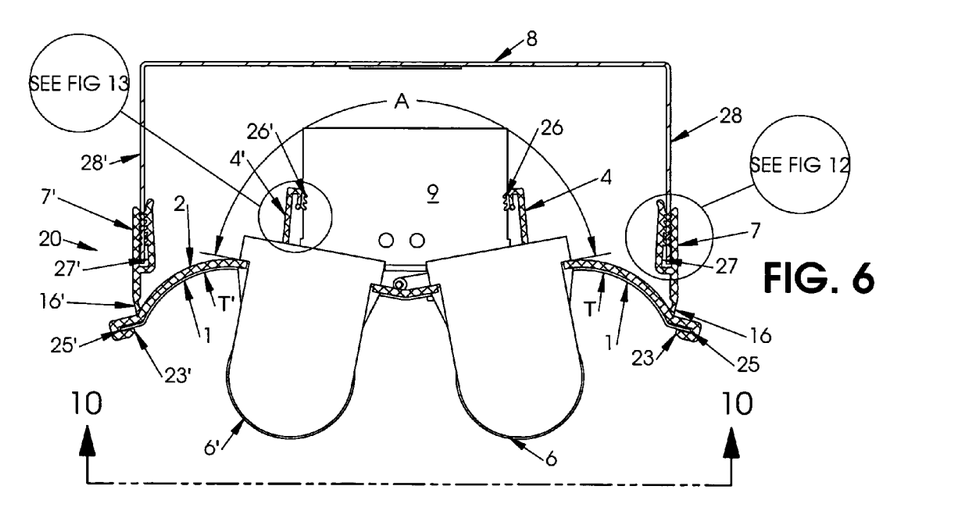
FIG. 6. Cross section view of assembly of light reflector sub-assembly apparatus attached to ceiling mount channel.

Slots 27, 27' in vertical wall 7 of formed plastic backing 2, (see FIGS. 2, 3, and 4), and the slots 27, 27' fit onto, by straddling, the sides of ceiling mount channel 8, (see FIG. 6).

Figure 3:
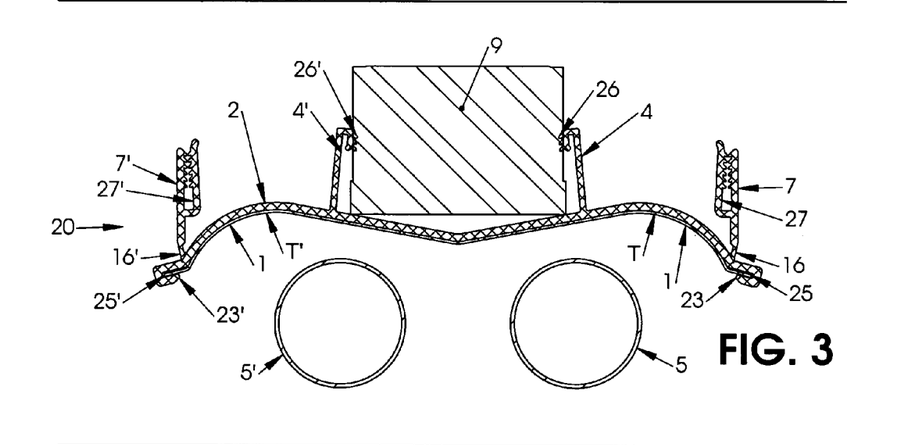
FIG. 3. Cross section elevation view of light reflector sub-assembly.
Figure 4:
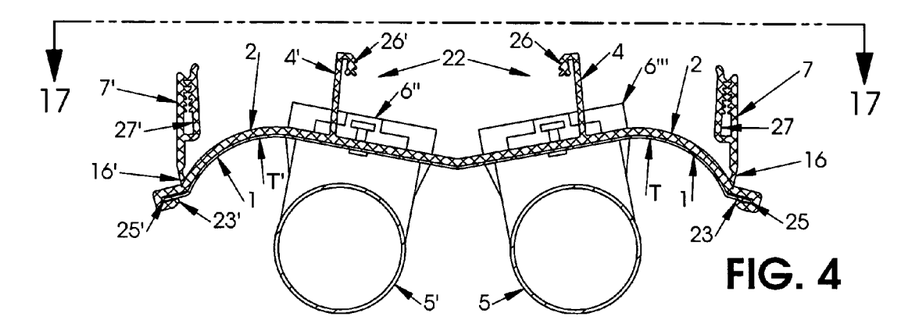
FIG. 4. Cross section of light reflector.
Figure 5:
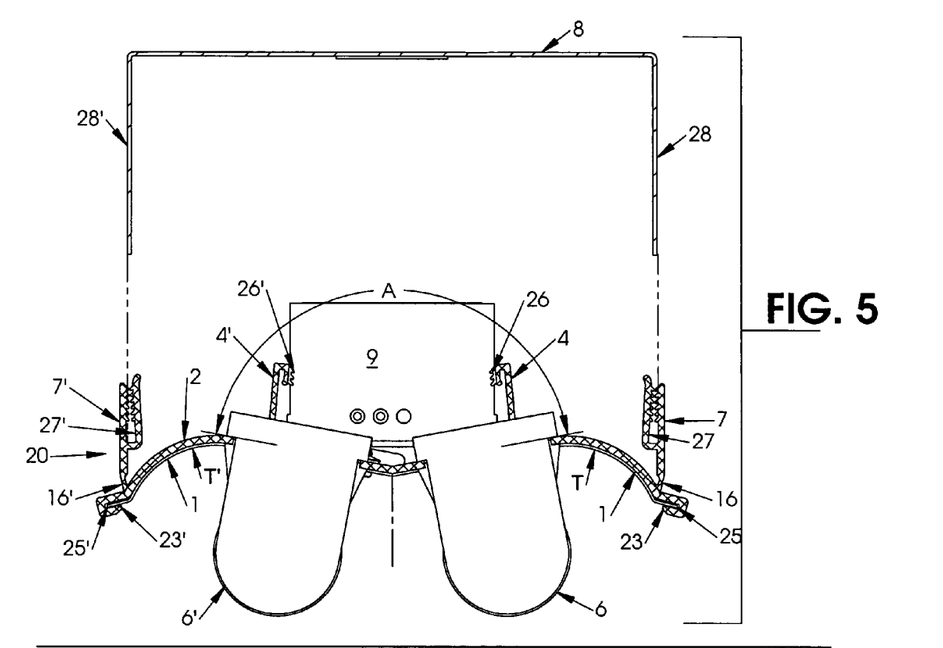
FIG. 5. Exploded end view of light reflector sub-assembly apparatus and ceiling mount channel.
Figure 13:
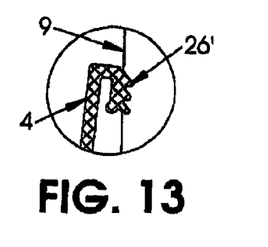
FIG. 13. Enlarged view of side wall of groove of formed plastic backing.

The ballast 9 is mounted in channel 22, see FIGS. 1, 3, and 6, and the ballast 9 is a friction fit in channel 22, held in position as shown in FIG. 13, by side walls 4, 4' of center channel 22 of formed plastic backing 2.

Figure 14:
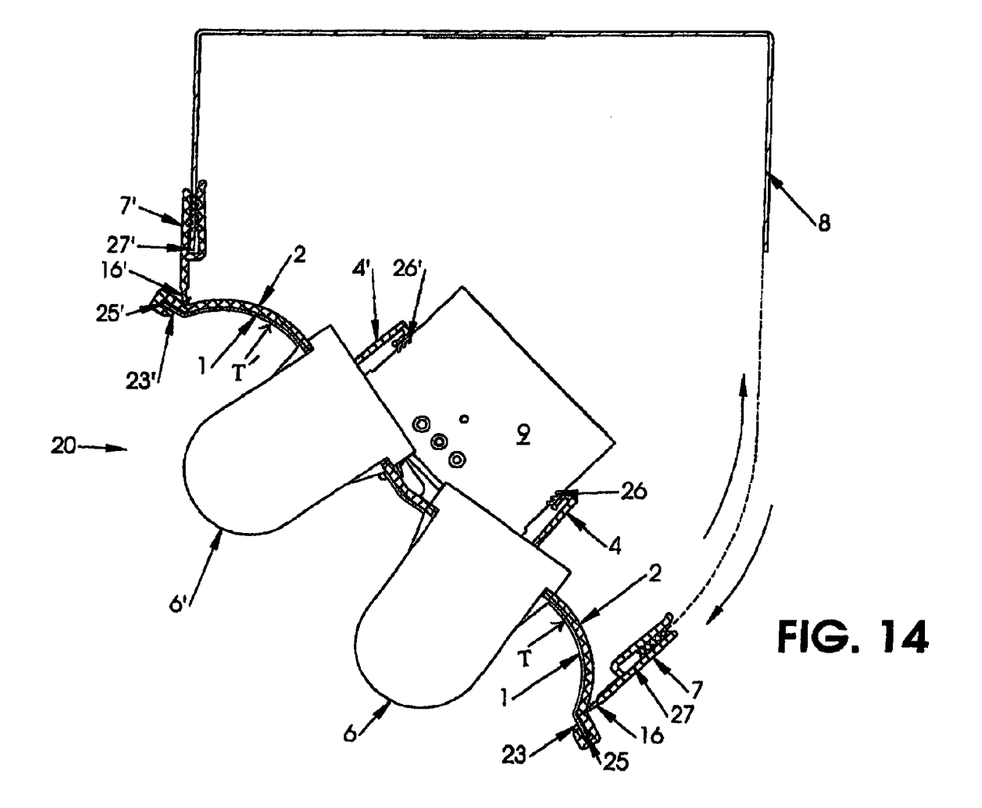
FIG. 14. Cross section view of formed plastic backing sub-assembly swung down-ward, supported by live hinge.

FIG. 14 cross section view of light reflector sub-assembly, swung down ward, and supported by live plastic hinge 16'. On swinging the sub-assembly down ward allows for repair of wires, or replacement of the ballast 9 as needed.

Referring to FIG. 15 there is shown a side elevation view of the complete assembly 24, of the luminaire fixture.

The longitudinal edges 25, 25' of fluorescent light tube reflector 1 fitted into slots 23, 23' in outer edges of formed plastic backing 2, to join the fluorescent light tube reflector 1 to the formed plastic backing 2, sub assembly of the light fixture. (see FIGS. 2, 3, 4, 5, 6 and 14). T here is intimate fitting of the reflector 1, and the formed plastic backing 2 as the fluorescent light tube reflector 1, and the formed plastic backing 2 have the same cross section contour. The contour shown in FIGS. 2, 3, 4, 5, 6 and 14, can best be described as an inverted double wave form or wave shape, and the fluorescent light tube sockets 6, 6', 6", 6"', mounted at the troughs of the wave shapes, for mounting of fluorescent light tubes 5 also in the troughs of the inverted wave form or shape. As an alternate to the wave shape, the reflectors could be a flat surface, or a single arc shape to reflect fluorescent light tubes and the formed plastic backing 2 to then have the same contour as the fluorescent light tube reflectors 1.

Referring now to FIGS. 2, 3, 4, 5, 6, and 14, the edges 25, 25' of fluorescent light tube reflector are fitted into slots 23, 23' respectively in outer edges of formed plastic backing 2.

Turned down edges 26, 26' of side walls 4, 4' holds the ballast 9 in a friction fit in channel 22 of formed plastic backing. The turned down segments are turned down on the inside of the channel 22 and the turned down sections 26, 26' may be corrugated as shown to provide more friction for holding the ballast 9.

Referring to FIGS. 2, 3, 4, 5, 6, 12 and 14 vertical sidewalls of formed plastic backing 2, and slots 27, 27' in vertical sidewalls 7, 7' and the slots 27 and 27' astraddle the side edges of ceiling mount channel 8, and the side edges of ceiling mount 8 fitting in slots 27, 27' of the vertical sidewalls 7, 7' to complete the retrofit fluorescent light tube fixture apparatus.

The formed plastic backing 2, of this invention may be formed of polyvinylchloride, identified as "rigid" which is preferred or other thermoplastic materials such as polypropylene, polycarbonate, and polyethylene. The reflectors may be of polished metal such as aluminum, steel or stainless steel, and chrome plated steel, for good light reflection. The polyvinylchloride (PVC), identified as rigid PVC (RPVC) having a Durometer hardness per ASTM D2240 (instantaneous) of 82, a flexural modulus per ASTM D790 of 417,000 psi, and a notched IZOD, per ASTM D250, of 24.5 ft-lb/in. Referring now to the live plastic hinge 16, 16', the preferred material is a flexible PVC (FPVC), having a Durometer hardness; Shore A per ASTM 2240 of 64, and Tear Strength per ASTM D624 of 200 lb/in.

The cross section contour of the reflectors 1 and the formed plastic backing 2 can best be described as, inverted wave form or shape, and the fluorescent light tube sockets 6, 6', 6" 6"' and fluorescent light tubes 5, 5' mounted in the troughs T, T' of the inverted wave shape, as shown in FIGS. 2, 3, 4, 5, 6, and 14.

A switch for on/off control of the fluorescent light fixture of this disclosure, is not shown, as the switch installation would be as desired, such as a wall switch, at the time of installation of this lighting fixture apparatus.

The fluorescent light tube reflector 1, to be a metal such as aluminum, steel, stainless steel, chrome plated steel. Aluminum is the preferred metal.

The formed plastic backing 2, for reflector 1, to be made from a plastic such as polyvinylchloride, (PVC), polypropylene, polycarbonate, or polyethylene. The preferred plastic backing 2, as noted above, is rigid polyvinylchloride, (PVC) and flexible polyvinyl (PVC) for the live plastic hinges 16, 16' can best be formed by co-extrusion with the rigid polyvinylchloride forming the plastic backing 2, for the fluorescent light tube reflectors 1.

The live plastic hinges 16 and 16' are connected to bases of sidewalls 27 and 27' respectively, and to the formed plastic backing 2, to thus provide a plastic live hinge joint. (See FIGS. 2, 3, 4, 5, 6, and 14) The live plastic hinges 16, 16' of flexible PVC, as described above, then allow a drop down of either side of the fixture apparatus as shown in FIG. 14, for retrofit or repair of the fixture assembly without removal from the ceiling mount channel 8.

In the above disclosure the word "reflector" is meant to include both reflectors as one unit.

The ceiling mount channel 8, to be either metal, such as steel, or rigid plastic such as polyvinylchloride (PVC), as described above.

Having described my invention, I claim:

1. Retrofit fluorescent light tube fixture apparatus comprising a subassembly having:
   a—a light reflector,
   b—a formed plastic backing for said light reflector,
   c—said formed plastic backing and said light reflector having the same cross section contour,
   d—said light reflector intimately attached to said formed plastic backing by means of edges of said light reflector, fitting in slots in outer edges of said formed plastic backing,
   e—fluorescent light tube sockets mounted on each end of said light reflector,
   f—a ballast mounted and held in position by friction fit between side walls of channel on said formed plastic backing,
   g—wires from said ballast connected to said fluorescent light tube sockets mounted at ends of said light reflector,
   h—said sub-assembly attached to a ceiling mount channel, by means of slots in side walls of said formed plastic backing, said slots in side walls fitting over downward extending edges of said ceiling mount channel,
   i—two live plastic hinges and each said live plastic hinge connected to a side wall of said formed plastic backing mid said formed plastic backing for said light reflector,
   j—electric power lines extending from ceiling through aperture in said ceiling mount channel, to said ballast,
   k—screw fasteners extending through said side walls of said formed plastic backing, and said downward extending edges of said ceiling mount channel and,
   l—fluorescent light tubes installed in said fluorescent light tube sockets to complete a retrofit fluorescent light tube fixture apparatus.

2. A retrofit fluorescent light tube fixture apparatus of claim 1, further comprising:
   a—said light reflector having an inverted double wave shape cross section contour trough of said light reflector
   b—an inverted double wave shape cross section contour of said formed plastic backing intimately joined to said inverted double wave shape cross section contour trough of said light reflector
   c—said fluorescent light tube sockets mounted on ends of inverted double wave shape cross section trough and,
   d—said fluorescent light tubes mounted in said fluorescent light tube sockets in said inverted wave shape cross section trough.

3. A retrofit fluorescent light tube fixture apparatus of claim 1, further comprising:
   a—said light reflector selected from the group consisting of aluminum, steel, stainless steel, and chrome plated steel.

4. A retrofit fluorescent light tube fixture apparatus, of claim 1, further comprising:
   a—a formed plastic backing, selected from the group consisting of rigid polyvinylchloride, polypropylene, polycarbonate, and polyethylene.

5. A retrofit fluorescent light tube fixture apparatus of claim 1, further comprising:
   a—said live plastic hinge selected from the group consisting of flexible polyvinylchloride, polypropylene, polycarbonate, and polyethylene.

6. A retrofit fluorescent light tube fixture apparatus of claim 1, further comprising:
   said ceiling mount channel formed of material selected from the group consisting of metal and plastic.

\* \* \* \* \*